(12) United States Patent
Boswell

(10) Patent No.: US 10,363,603 B2
(45) Date of Patent: Jul. 30, 2019

(54) METHOD FOR PRODUCING A COMPONENT AND AN APPARATUS FOR WORKING THE METHOD

(71) Applicant: ROLLS-ROYCE plc, London (GB)

(72) Inventor: John H Boswell, Derby (GB)

(73) Assignee: ROLLS-ROYCE plc, London (GB)

( * ) Notice: Subject to any disclaimer, the term of this patent is extended or adjusted under 35 U.S.C. 154(b) by 269 days.

(21) Appl. No.: 15/202,066

(22) Filed: Jul. 5, 2016

(65) Prior Publication Data
US 2017/0028471 A1    Feb. 2, 2017

(30) Foreign Application Priority Data

Jul. 31, 2015 (GB) .................................. 1513532

(51) Int. Cl.
*B22F 3/10* (2006.01)
*B22F 3/105* (2006.01)
(Continued)

(52) U.S. Cl.
CPC .......... *B22F 3/1017* (2013.01); *B22F 3/1055* (2013.01); *B28B 1/001* (2013.01);
(Continued)

(58) Field of Classification Search
CPC ................. B22F 3/1017; B22F 3/1055; B22F 2003/1056; B33Y 10/00; B29C 64/153; B28B 1/001; Y02P 10/295
See application file for complete search history.

(56) References Cited

U.S. PATENT DOCUMENTS 5,155,321 A * 10/1992 Grube ................... B22F 3/1055
219/121.85
2006/0219671 A1    10/2006 Merot et al.
(Continued)

FOREIGN PATENT DOCUMENTS

| DE | 10 2012 012344 A1 | 9/2013 | |
| DE | 102015201796 B3 * | 6/2016 | ............... B23K 9/04 |
| WO | 2015/119692 A2 | 8/2015 | |

OTHER PUBLICATIONS

N. P. Juster, "Rapid prototyping using the selective sintering process. Assembly Automation", vol. 14 Iss: 2, pp. 14-17. Dept. of Mech. Eng., University of Leeds (1994)). (Year: 1994).*
(Continued)

*Primary Examiner* — Kevin E Yoon
*Assistant Examiner* — Ryan L Heckman
(74) *Attorney, Agent, or Firm* — Oliff PLC

(57) ABSTRACT

A powder deposition apparatus for producing a component comprises a base plate, an annular stack of heating elements, accommodating the base plate, one or more insulating elements, being interleaved between adjoining heating elements, a mechanism operable to deposit a plurality of layers of a powder material onto the base plate, and a laser energy source operable to selectively fuse a portion of the deposited layer. The annular stack of heating elements is sized such that a predetermined clearance is defined between the component and the annular stack of heating elements.
As successive layers of the powder material are deposited onto the base plate, the base plate is lowered into the stack of heating elements, the heating elements being actuated sequentially to maintain a pre-determined temperature profile in the deposited layers.

19 Claims, 1 Drawing Sheet

Section A-A

(51) Int. Cl.
  *B33Y 10/00* (2015.01)
  *B28B 1/00* (2006.01)
  *B29C 64/153* (2017.01)

(52) U.S. Cl.
  CPC ............ *B29C 64/153* (2017.08); *B33Y 10/00* (2014.12); *B22F 2003/1056* (2013.01); *Y02P 10/295* (2015.11)

(56) References Cited

U.S. PATENT DOCUMENTS

| | | |
|---|---|---|
| 2010/0101490 A1 | 4/2010 | Bokodi et al. |
| 2012/0090734 A1 | 4/2012 | Heinlein |
| 2013/0309420 A1* | 11/2013 | Flesch .................. B22F 3/1055 427/591 |
| 2014/0165381 A1 | 6/2014 | Rauschenbach et al. |
| 2015/0165681 A1 | 6/2015 | Fish et al. |
| 2016/0288266 A1* | 10/2016 | Rockstroh ............. B22F 3/1055 |

OTHER PUBLICATIONS

Machine Translation of DE-102015201796-B3 (Year: 2016).*
Feb. 17, 2016 Search Report issued in British Application No. 1513532.0.
Dec. 8, 2016 Search Report issued in European Patent Application No. 16 17 7928.

* cited by examiner

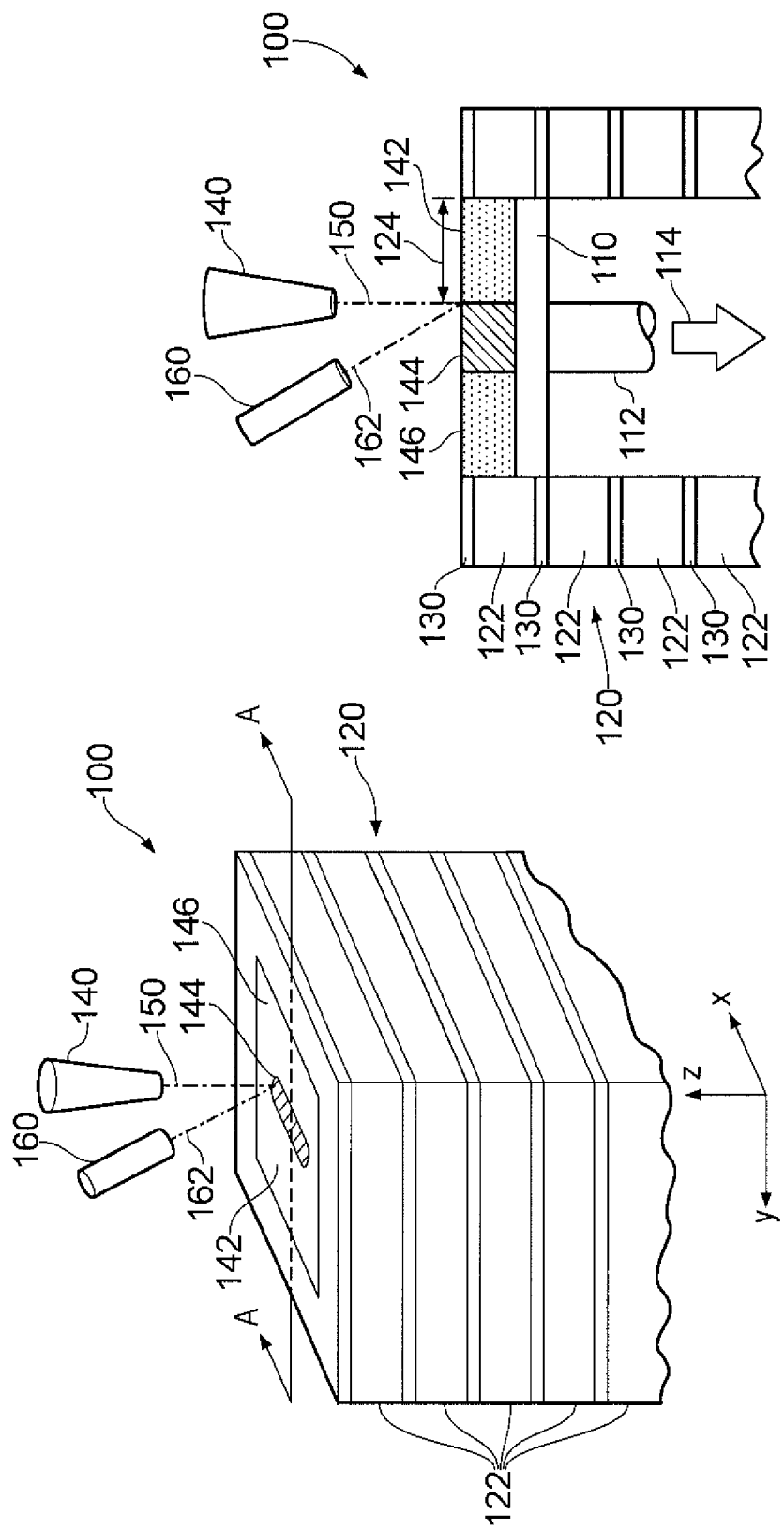

METHOD FOR PRODUCING A COMPONENT AND AN APPARATUS FOR WORKING THE METHOD

This disclosure claims the benefit of UK Patent Application No. 1513532.0, filed on 31 Jul. 2015, which is hereby incorporated herein in its entirety.

FIELD OF THE DISCLOSURE

The present disclosure relates to a method for producing a component using a powder deposition apparatus and particularly, but not exclusively, to a method for producing a turbomachine component using a powder deposition apparatus.

BACKGROUND TO THE DISCLOSURE

Direct laser deposition is an additive layer process used to produce complex and intricate shapes that cannot easily be produced by any other manufacturing method. Direct laser deposition is a powder bed process in which a component is built up layer by layer by the melting and fusion of a plurality of layers of the component material.

A single layer of the component material is deposited onto a base plate and then fused by a high energy laser source. The base plate is then incrementally lowered and another layer of the powder material is applied to the base plate. This process is then repeated layer by layer until the finished component is produced.

The rapid heating and cooling cycles occurring during the fusion process, as the laser source follows the profile of the component, are known to cause residual stresses within the component. These residual stresses may in turn cause deformation of the component geometry.

This deformation can limit the type of materials that can be successfully deposited using the direct laser deposition process. For example, metals and metal alloys that are considered to be weldable, such as nickel superalloys containing high gamma prime volume fractions, are difficult to deposit by the direct laser deposition process due to post build cracking caused by residual stresses.

It is known to provide heating to the powder bed containing the component as it is formed, in order to reduce the thermal gradients that can induce residual stresses and hence the incidence of cracks whether during or after build. However, heating the entire powder bed is energy intensive and hence costly.

Alternatively, local heating may be provided within the powder bed, for example by induction coils. This approach limits the space available within the build chamber and may interfere with the shielding gas flow and the movement of the laser source. Additionally the high frequency current required for induction heating may also interfere with other electrical equipment that forms part of the direct laser deposition.

STATEMENTS OF DISCLOSURE

According to a first aspect of the present disclosure there is provided a method for producing a component using a powder deposition apparatus, the powder deposition apparatus comprising a base plate enclosed by an annular stack of heating elements, adjoining heating elements being separated by respective insulating layers, the method comprising the steps of:

(i) selecting a stack of heating elements such that a pre-determined clearance is defined between the component and the stack of heating elements;
(ii) aligning the base plate with an uppermost heating element in the stack of heating elements;
(iii) depositing a layer of a powder material onto the base plate;
(iv) providing energy to the uppermost heating element to heat the deposited powder material to a first temperature;
(v) selectively fusing a proportion of the layer using a laser energy source, the selectively fused material corresponding to a respective cross-section of the component;
(vi) lowering the base plate into the stack of heating elements by a pre-determined layer thickness;
(vii) repeating steps (iii), (iv) and (v) to build up a thickness of the component;
(viii) as the thickness of the component exceeds a depth of the heating element, and multiples thereof, providing energy to corresponding successive heating elements in the stack; and
repeating steps (iii) to (viii) until the component is complete.

The use of a stack of heating elements provides for more accurate temperature control through the deposited depth, or thickness, of the component during the deposition process. This in turn enables the method of the invention to control the direction of heat flow from the component during the component build process.

In a conventional powder deposition method, a majority of the heat flow from the component is conducted into the build plate at the base of the component. This may result in a component material grain structure that is columnar or texturally aligned with the build direction. This in turn can result in the finished component having anisotropic material properties.

The stack of heating elements of the invention allows the control of the heat flow from the component and thereby reduces the degree of texture within the material structure. This produces a more uniform grain structure that can redistribute stresses more evenly, so reducing the propensity for the material to crack during the forming process. The individual control of the heating elements allows the method of disclosure to control both the temperature of the powder bed and the temperature gradient through the powder bed during the deposition process.

The multiple insulating layers provide for separation of the individual heater zones. By preventing heat transfer in the through-thickness (or 'Z') direction, the insulating layers limit heat transfer from the individual heating elements into the powder bed and thence the component, to the across-plane (or 'X'-'Y') plane.

The stack of heating elements is sized such that a pre-determined clearance is provided between an inner volume defined by the stack of heating elements and the component. In this way, the interior volume defined by the annular stack of heating elements may be minimised. This minimises the amount of powder material contained within the bed as defined by the internal volume of the stack of heating elements. This enables the heat energy provided by the heating elements to be applied more effectively because there is a smaller volume of powder being heated, and the radial distance between the heating elements and the component is minimised.

Optionally, step (viii) comprises the step of:

(viii)' as the thickness of the component exceeds a depth of the heating element, and multiples thereof, providing energy to corresponding successive heating elements in the stack, such that each of the second, third, fourth, . . . n'th successive heating elements heats the deposited powder material to a second, third, fourth, . . . n'th temperature respectively.

Variation of the energy supplied to the successive heating elements in the stack enables a temperature gradient through the thickness of the component to be generated and maintained through the deposition process.

Optionally, each of the second, third, fourth, . . . n'th temperature is equal to the first temperature.

The use of a single temperature for each of the heating elements within the stack results in the component being heated uniformly through its thickness as it is being formed. This makes the method of the disclosure simple and cost effective to operate.

Optionally, each of the second, third, fourth, . . . n'th temperature is less than the first temperature, with the second, third, fourth, . . . n'th temperature being defined by a pre-determined temperature profile.

By varying the temperatures of the second and subsequent heating elements, the method of the disclosure enables a pre-determined temperature gradient to be generated though the thickness of the component. This enables a user of the method to control the cooling of the component after deposition so as to prevent thermal gradients that can induce residual stresses in the component.

This in turn enables the method of the disclosure to be applied to the direct laser deposition of materials that have previously been unusable with this process, such as titanium alloys, and nickel superalloys containing high y' volume fractions.

For example, titanium alloys experience extremely high residual stress levels when used in a direct laser deposition process, which generally results in cracks in a finished component.

Optionally, energy is supplied intermittently to each of the second, third, fourth, . . . n'th successive heating elements at a pre-determined frequency.

By varying the frequency at which energy is supplied to each of the heating elements, it is possible to vary the temperature of the corresponding heating elements.

In one arrangement, energy may be supplied to the heating elements in a continuously varying manner. In another arrangement, the energy may be supplied to the heating elements in an 'on-off' manner, by varying the mark-space ratio of the energy supply.

Optionally, the first temperature is greater than 300° C., and less than 90% of the melting point (° C.) of the powder material.

The use of a first temperature being greater than 300° C., and less than 90% of the melting point (° C.) of the powder material means that the energy required from the laser energy source, to fuse the powder material, is reduced. This makes the method of the disclosure quicker than a conventional method and hence more convenient for a user.

The pre-heating temperature may be varied for different material compositions.

Optionally, the powder material is selected from the group comprising metals, metal alloys, silicates, ceramics, or mixtures thereof.

The direct laser deposition process is typically applied to the deposition of metals and metal alloys in powder form.

However, as outlined above, there are some materials with which conventional direct laser deposition processes cannot be applied.

The feature of the present disclosure of providing and maintaining a pre-determined temperature gradient through the thickness of the material extends the applicability of the method to materials that previously could not be processed by direct laser deposition techniques.

Optionally, the insulating layers are formed from a material selected from the group comprising refractory ceramics, and ceramic fibre materials.

In one arrangement, the insulating layers are formed as refractory ceramic layers interposed between the adjoining heating elements. In an alternative arrangement, the insulating layers may be formed from a ceramic fibre material, which may be bonded into a sheet form.

In a further alternative arrangement, the insulating layers may be formed as a combination of refractory ceramic and ceramic fibre materials.

Optionally, the heating elements are selected from the group comprising electrical resistance heaters, induction heaters, or convection gas heaters.

In one arrangement, the heating elements comprise electrical resistance heaters that are embedded into a matrix, which is then interposed between adjoining insulating layers.

Alternatively, the heating elements may comprise induction heating elements, again embedded in a matrix that enables interpositioning with the insulating layers.

The use of electrical resistance or induction heating elements enables a straightforward control of energy input by, for example, varying the quantity of electrical energy supplied to the heater elements, or by varying a frequency at which the energy is supplied to the heater elements.

In a further alternative arrangement, the heating elements comprise hollow duct elements into which a heated inert gas is circulated. This arrangement is more complex than the use electrical resistance or induction heating elements but has an advantage in that there is less likelihood of electrical interference to the laser energy source and its associated control hardware.

Optionally, the laser energy source is selected from the group comprising solid state lasers, gas lasers and diode lasers.

Optionally, the component is a turbomachine component.

Turbomachinery components are typically produced from materials that are difficult to weld, such as nickel superalloys containing high gamma prime volume fractions. The method of the present disclosure enables such materials to be used in a direct laser deposition process.

Optionally, the component is a turbine component.

Turbine components are typically produced from materials that are difficult to weld, such as nickel superalloys containing high gamma prime volume fractions. The method of the present disclosure enables such materials to be used in a direct laser deposition process.

Optionally, the component is a compressor component.

Compressor components are typically produced from materials that are difficult to weld, such as nickel superalloys containing high gamma prime volume fractions. The method of the present disclosure enables such materials to be used in a direct laser deposition process.

According to a second aspect of the present disclosure there is provided a powder deposition apparatus for producing a component, the apparatus comprising:
- an annular stack of heating elements;
- a base plate accommodated within the annular stack of heating elements;
- one or more insulating elements, being interleaved between adjoining heating elements;
- a mechanism operable to deposit a plurality of layers of a powder material onto the base plate; and
- a laser energy source operable to selectively fuse a portion of the deposited layer,
- wherein successive layers of the powder material are deposited onto the base plate, with a predetermined clearance being maintained between an outer perimeter of the layer of the powder material and the annular stack of heating elements, and the plurality of layers forming the component.

The use of a stack of heating elements provides for more accurate temperature control through the deposited depth, or thickness, of the component during the deposition process.

The individual control of the heating elements allows the method of disclosure to control both the temperature of the powder bed and the temperature gradient through the powder bed during the deposition process.

The multiple insulating layers provide for separation of the individual heater zones. By preventing heat transfer in the through-thickness (or 'Z') direction, the insulating layers limit heat transfer from the individual heating elements into the powder bed and thence the component, to the across-plane (or 'X'-'Y') plane.

The annular stack of heating elements is sized such that a predetermined clearance is defined between the component and the annular stack of heating elements. The clearance may be determined by thermal modelling or by another theoretical determination technique. Alternatively, the clearance may be determined by an experimental means.

Optionally, the powder material is selected from the group comprising metals, metal alloys, silicates, ceramics, or mixtures thereof.

The direct laser deposition process is typically applied to the deposition of metals and metal alloys in powder form. However, as outlined above, there are some materials with which conventional direct laser deposition processes cannot be applied.

The feature of the present disclosure of providing and maintaining a pre-determined temperature gradient through the thickness of the material extends the applicability of the method to materials that previously could not be processed by direct laser deposition techniques.

Optionally, the insulating layers are formed from a material selected from the group comprising refractory ceramics, and ceramic fibre materials.

In one arrangement, the insulating layers are formed as refractory ceramic layers interposed between the adjoining heating elements. In an alternative arrangement, the insulating layers may be formed from a ceramic fibre material, which may be bonded into a sheet form.

In a further alternative arrangement, the insulating layers may be formed as a combination of refractory ceramic and ceramic fibre materials.

Optionally, the heating elements are selected from the group comprising electrical resistance heaters, induction heaters, or convection gas heaters.

In one arrangement, the heating elements comprise electrical resistance heaters that are embedded into a matrix, which is then interposed between adjoining insulating layers.

Alternatively, the heating elements may comprise induction heating elements, again embedded in a matrix that enables interpositioning with the insulating layers.

The use of electrical resistance or induction heating elements enables a straightforward control of energy input by, for example, varying the quantity of electrical energy supplied to the heater elements, or by varying a frequency at which the energy is supplied to the heater elements.

In a further alternative arrangement, the heating elements comprise hollow duct elements into which a heated inert gas is circulated. This arrangement is more complex than the use electrical resistance or induction heating elements but has an advantage in that there is less likelihood of electrical interference to the laser energy source and its associated control hardware.

Optionally, the laser energy source is selected from the group comprising solid state lasers, gas lasers and diode lasers.

Optionally, the component is a turbomachine component.

Turbomachinery components are typically produced from materials that are difficult to weld, such as nickel superalloys containing high gamma prime volume fractions. The method of the present disclosure enables such materials to be used in a direct laser deposition process.

Optionally, the component is a turbine component.

Turbine components are typically produced from materials that are difficult to weld, such as nickel superalloys containing high gamma prime volume fractions. The method of the present disclosure enables such materials to be used in a direct laser deposition process.

Optionally, the component is a compressor component.

Compressor components are typically produced from materials that are difficult to weld, such as nickel superalloys containing high gamma prime volume fractions. The method of the present disclosure enables such materials to be used in a direct laser deposition process.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which:

FIG. 1 shows a schematic perspective view of a powder deposition apparatus according to an embodiment of the disclosure; and FIG. 2 shows a schematic sectional view of the powder deposition apparatus of FIG. 1.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Referring to FIGS. 1 and 2, a powder deposition apparatus according to an embodiment of the disclosure is designated generally by the reference numeral 100.

The apparatus 100 comprises a base plate 110 enclosed by a stack 120 of individual heating elements 122. The base plate 110 is formed from a metal such as steel or a steel alloy.

The base plate 110 is movable within the stack 120 with this vertical ('Z' direction) movement produced by an actuator (not shown) connected to the base plate 110 by an actuating rod 112. In the present arrangement, the actuator is a hydraulic cylinder (not shown). Alternatively, the actuator may be any suitable mechanical or electro-mechanical actuator such as, for example, an electric motor and rack, a linear electrical actuator or similar.

The stack 120 of heating elements 122 forms an enclosed chamber within which the base plate is movable. The individual heating elements 122 are interleaved with corresponding insulating elements 130.

The stack 120 of heating elements 122 defines a predetermined clearance 124 between the stack 120 and the component 144.

In the present arrangement, the heating elements 122 are electrical resistance heating elements that are individually controlled by a controller (not shown). In this arrangement, the electrical resistance heating elements are embedded into a thermally conductive matrix.

Each of the insulating elements 130 is formed from moulded refractory ceramic material.

The apparatus 100 further comprises a powder deposition mechanism 140 that is operable to deposit a layer 142 of powder material 150 onto the base plate 110. The deposited layer 142 has a pre-determined thickness. This powder deposition mechanism 140 is a standard feature of conventional direct laser deposition techniques and so is not described in further detail.

The apparatus 100 still further comprises a laser energy source 160 that is operable to selectively fuse a portion of the deposited powder layer 142. The laser energy source 160 generates a laser beam 162 that is directed at the deposited layer 142 of the powder material.

In use, a layer 142 of the powder material 150 is deposited across the surface of the base plate 110 by the powder deposition mechanism 140.

The uppermost of the heating elements 122 is actuated to heat the adjoining powder material to a first temperature of 80% of the melting point of the powder material 150.

The laser energy source 160 is actuated with the laser beam 162 being used to selectively fuse a portion of the deposited layer of powder material 150. The fused powder material corresponds to a sectional outline of the finished component.

The base plate 110 is then lowered by a distance equal to the thickness of the subsequent layer of deposited material. The deposition and fusing processes are then repeated to form another layer of the component.

This deposition and fusing sequence is similar to that employed by conventional direct laser deposition techniques and so is not described further.

As the base plate 110 moves downwards within the stack 120 of heating elements 120, it will pass the second and then subsequent heating elements 122. As the base plate 110 passes the second heating element, the second heating element 122 is actuated to heat the deposited powder material 150 to a second temperature. In this arrangement, each of the second and subsequent heating elements is actuated to heat the adjoining powder material to a temperature of 70% of the melting point of the powder material.

This sequential actuation of the heating elements 122 in the stack 120 continues as the base plate 110 is withdrawn into the stack 120 of heating elements 122.

In the present arrangement, the actuation of the second and subsequent heating elements 122 is such as to generate a temperature profile across the Z-direction or through thickness of the component and surrounding deposited powder material 150.

The actuation of the heating elements is arranged to provide a substantially even temperature profile throughout the bed, with the powder material surrounding the component being at a lower temperature than the component itself to allow for heat transfer from the component to the bed.

In the present arrangement, the second and subsequent heating elements 122 heat the corresponding adjoining powder material 150 to temperatures that are less than that of the uppermost or first heating element 122.

The heating elements may remain active for some period of time after the component has been formed. In an alternative arrangement, the heat energy supplied to the heating elements may be decreased over a pre-determined period of time after the completion of the component.

Once the base plate 110 is fully retracted into the stack of heating elements 120, the component is completely formed.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A method for producing a component using a powder deposition apparatus, the powder deposition apparatus comprising an annular stack of heating elements, each heating element of the annular stack of heating elements comprising a heater embedded in a thermally conductive matrix, a base plate accommodated within the annular stack of heating elements, adjoining heating elements being separated by a plurality of insulating elements interleaved between adjoining heating elements, such that each insulating element of the plurality of insulating elements is positioned between axial ends of the thermally conductive matrix of adjoining heating elements, the plurality of insulating elements being positioned such that a radially inner surface of the conductive matrix of each heating element is not insulated, a mechanism operable to deposit a plurality of layers of a powder material onto the base plate, and a laser energy source operable to selectively fuse a portion of the deposited layer, the method comprising the steps of:

(i) selecting the annular stack of heating elements such that a pre-determined clearance is defined and maintained between the component and the annular stack of heating elements, the annular stack of heating elements forming an enclosed chamber;

(ii) aligning the base plate with an uppermost heating element in the annular stack of heating elements;

(iii) depositing a layer of the powder material onto the base plate;

(iv) providing energy to the uppermost heating element to heat the deposited powder material to a first temperature;

(v) selectively fusing a proportion of the layer using the laser energy source, the selectively fused material corresponding to a respective cross-section of the component;

(vi) lowering the base plate into the enclosed chamber formed by the annular stack of heating elements by a pre-determined layer thickness, such that the radially inner surface of the conductive matrix of each heating element directly contacts the powder material contained within the enclosed chamber;

(vii) repeating steps (iii), (iv) and (v) to build up a thickness of the component;

(viii) as the thickness of the component exceeds a depth of the heating element, and multiples thereof, providing energy to corresponding successive heating elements in the stack; and repeating steps (iii) to (viii) until the component is complete.

2. The method as claimed in claim 1, wherein step (viii) comprises the step of:

(viii)' as the thickness of the component exceeds a depth of the heating element, and multiples thereof, providing energy to corresponding successive heating elements in the stack, such that each of the second, third, fourth, . . . n'th successive heating elements heats the deposited powder material to a second, third, fourth, . . . n'th temperature respectively.

3. The method as claimed in claim 2, wherein each of the second, third, fourth, . . . n'th temperature is equal to the first temperature.

4. The method as claimed in claim 2, wherein each of the second, third, fourth, . . . n'th temperature is less than the first temperature, with the second, third, fourth, . . . n'th temperature being defined by a pre-determined temperature profile.

5. The method as claimed in claim 2, wherein energy is supplied intermittently to each of the second, third, fourth, . . . n'th successive heating elements at a pre-determined frequency.

6. The method as claimed in claim 1, wherein the first temperature is greater than 300° C., and less than 90% of the melting point (° C.) of the powder material.

7. The method as claimed in claim 1, wherein the powder material is selected from the group comprising metals, metal alloys, silicates, ceramics, or mixtures thereof.

8. The method as claimed in claim 1, wherein the insulating elements are formed from a material selected from the group comprising refractory ceramics, and ceramic fibre materials.

9. The method as claimed in claim 1, wherein the heater of each of the heating elements are is selected from the group comprising electrical resistance heaters, induction heaters, or convection gas heaters.

10. The method as claimed in claim 1, wherein the laser energy source is selected from the group comprising solid state lasers, gas lasers and diode lasers.

11. The method as claimed in claim 1, wherein the component is a turbomachine component.

12. The method as claimed in claim 1, wherein the component is a turbine component.

13. The method as claimed in claim 1, wherein the component is a compressor component.

14. A powder deposition apparatus for producing a component, the apparatus comprising:

an annular stack of heating elements, the annular stack of heating elements forming an enclosed chamber, each heating element of the annular stack of heating elements comprising a heater embedded in a thermally conductive matrix;

a base plate accommodated within the annular stack of heating elements;

a plurality of insulating elements interleaved between the heating elements, such that each insulating element of the plurality of insulating elements is positioned between axial ends of the thermally conductive matrix of adjoining heating elements, the plurality of insulating elements being positioned such that a radially inner surface of the conductive matrix of each heating element is not insulated;

a mechanism operable to deposit a plurality of layers of a powder material onto the base plate, the radially inner surface of the conductive matrix of each heating element is configured to directly contact the powder material contained within the enclosed chamber; and a laser energy source operable to selectively fuse a portion of the deposited layer, wherein successive layers of the powder material are deposited onto the base plate, with a predetermined clearance being maintained between the annular stack of heating elements and the component.

15. The powder deposition apparatus as claimed in claim 14, wherein the powder material is selected from the group comprising metals, metal alloys, silicates, ceramics, or mixtures thereof.

16. The powder deposition apparatus as claimed in claim 14, wherein the insulating layers are formed from a material selected from the group comprising refractory ceramics, and ceramic fibre materials.

17. The powder deposition apparatus as claimed in claim 14, wherein the heater of each of the heating elements is selected from the group comprising electrical resistance heaters, induction heaters, or convection gas heaters.

18. The powder deposition apparatus as claimed in claim 14, wherein the laser energy source is selected from the group comprising solid state lasers, gas lasers and diode lasers.

19. The powder deposition apparatus as claimed in claim 14, wherein the component is a turbomachine component.

* * * * *